United States Patent
Yamashita et al.

(10) Patent No.: US 12,212,091 B2
(45) Date of Patent: Jan. 28, 2025

(54) ELECTRICAL CONNECTOR APPARATUS WITH IMPROVED WATERPROOFING AND COMPACT SIZE AND METHOD OF MANUFACTURING THEREOF

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takuya Yamashita, Mie (JP); Tatsuo Hirabayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 336 days.

(21) Appl. No.: 17/802,723

(22) PCT Filed: Mar. 4, 2021

(86) PCT No.: PCT/JP2021/008563
§ 371 (c)(1),
(2) Date: Aug. 26, 2022

(87) PCT Pub. No.: WO2021/177427
PCT Pub. Date: Sep. 10, 2021

(65) Prior Publication Data
US 2023/0144414 A1    May 11, 2023

(30) Foreign Application Priority Data

Mar. 6, 2020   (JP) ................................ 2020-039413

(51) Int. Cl.
*H01R 13/504* (2006.01)
*B23K 26/50* (2014.01)
(Continued)

(52) U.S. Cl.
CPC ............ *H01R 13/504* (2013.01); *B23K 26/50* (2015.10); *B23K 26/57* (2015.10); *B29C 65/16* (2013.01);
(Continued)

(58) Field of Classification Search
CPC .... H01R 13/504; H01R 12/55; H01R 12/724; H01R 13/40; H01R 13/405; H01R 13/52;
(Continued)

(56) References Cited

FOREIGN PATENT DOCUMENTS

| JP | H03-059673 U1 | 6/1991 |
| JP | H10-076528 A | 3/1998 |

(Continued)

OTHER PUBLICATIONS

International Search Report issued on May 25, 2021 for WO 2021/177427 A1 (6 pages).

*Primary Examiner* — Justin M Kratt
(74) *Attorney, Agent, or Firm* — Venjuris, P.C.

(57) ABSTRACT

Provided is a connector apparatus including: a circuit board; a connector; and a mold resin portion, wherein the circuit board includes a conductor path, the connector includes a housing with a cylindrical shape and made of a resin, and a terminal projecting outward in an axial direction of the housing from inside the housing, the terminal being configured to connect to the conductor path, the mold resin portion collectively covers the circuit board, the terminal located outside the housing, and a portion of the housing; the housing and the mold resin portion include a welded portion formed by welding together constituent materials of the housing and the mold resin portion, and the welded portion (Continued)

is provided around an entire periphery of the housing and has a difference between a maximum width and a minimum width along a circumferential direction of the housing of 30% or less of the maximum width.

13 Claims, 6 Drawing Sheets

(51) Int. Cl.
    *B23K 26/57*     (2014.01)
    *B29C 65/16*     (2006.01)
    *H01R 12/55*     (2011.01)
    *H01R 12/72*     (2011.01)
    *H01R 13/40*     (2006.01)
    *H01R 13/405*     (2006.01)
    *H01R 13/52*     (2006.01)
    *H01R 43/02*     (2006.01)
    *H01R 43/24*     (2006.01)
    *B23K 26/00*     (2014.01)
    *B23K 26/60*     (2014.01)
    *B29C 65/00*     (2006.01)
    *B29C 65/02*     (2006.01)
    *B29C 65/14*     (2006.01)
    *H01R 12/50*     (2011.01)
    *H01R 12/51*     (2011.01)
    *H01R 12/57*     (2011.01)
    *H01R 12/58*     (2011.01)
    *H01R 12/71*     (2011.01)
    *H01R 13/50*     (2006.01)
    *H01R 13/502*     (2006.01)
    *H01R 43/00*     (2006.01)
    *H01R 43/20*     (2006.01)

(52) U.S. Cl.
    CPC ........... H01R 12/55 (2013.01); H01R 12/724 (2013.01); H01R 13/40 (2013.01); H01R 13/405 (2013.01); H01R 13/52 (2013.01); H01R 13/5213 (2013.01); H01R 13/5216 (2013.01); H01R 43/02 (2013.01); H01R 43/24 (2013.01); *B23K 26/00* (2013.01); *B23K 26/60* (2015.10); *B29C 65/00* (2013.01); *B29C 65/02* (2013.01); *B29C 65/14* (2013.01); *H01R 12/50* (2013.01); *H01R 12/51* (2013.01); *H01R 12/57* (2013.01); *H01R 12/58* (2013.01); *H01R 12/71* (2013.01); *H01R 12/712* (2013.01); *H01R 12/716* (2013.01); *H01R 12/727* (2013.01); *H01R 13/50* (2013.01); *H01R 13/502* (2013.01); *H01R 43/00* (2013.01); *H01R 43/20* (2013.01)

(58) Field of Classification Search
    CPC ................. H01R 13/5213; H01R 13/5216; H01R 43/02; H01R 43/24; H01R 12/50; H01R 12/51; H01R 12/57; H01R 12/58; H01R 12/71; H01R 12/712; H01R 12/716; H01R 12/727; H01R 13/50; H01R 13/502; H01R 43/00; H01R 43/20; B23K 26/50; B23K 26/57; B23K 26/00; B23K 26/60; B29C 65/16; B29C 65/00; B29C 65/02; B29C 65/14
    See application file for complete search history.

(56) References Cited

FOREIGN PATENT DOCUMENTS

| | | | |
|---|---|---|---|
| JP | 2010040992 A | * | 2/2010 |
| JP | 2010-098097 A | | 4/2010 |
| JP | 2014-103091 A | | 6/2014 |
| JP | 2014-177051 A | | 9/2014 |
| JP | 2014-194899 A | | 10/2014 |
| JP | 2017-004698 A | | 1/2017 |
| WO | 2016/084537 A1 | | 6/2016 |
| WO | 2019/039244 A1 | | 2/2019 |

* cited by examiner

ELECTRICAL CONNECTOR APPARATUS WITH IMPROVED WATERPROOFING AND COMPACT SIZE AND METHOD OF MANUFACTURING THEREOF

CROSS REFERENCE TO RELATED APPLICATIONS

This application is a national phase of PCT application No. PCT/JP2021/008563, filed on 4 Mar. 2021, which claims priority from Japanese patent application No. 2020-039413, filed on 6 Mar. 2020, all of which are incorporated herein by reference.

TECHNICAL FIELD

The present disclosure relates to a connector apparatus and a method of manufacturing a connector apparatus.

This application claims priority based on Japanese Patent Application No. 2020-039413 filed on Mar. 6, 2020, the contents of which are incorporated herein by reference.

BACKGROUND

In the electronic apparatus described in Patent Document 1, a circuit board and a portion of a connector are housed in a housing. The housing is configured by assembling together a case and a cover. A sealant is disposed between the case and the cover, and the internal space of the housing is made a waterproof space. Hereinafter, the electronic apparatus is referred to as a connector apparatus.

PRIOR ART DOCUMENT

Patent Document

Patent Document 1: JP 2017-004698 A

SUMMARY OF THE INVENTION

A connector apparatus according to the present disclosure includes: a circuit board; a connector; and a mold resin portion, wherein the circuit board includes a conductor path, the connector includes a housing with a cylindrical shape and made of a resin, and a terminal projecting outward in an axial direction of the housing from inside the housing, the terminal being configured to connect to the conductor path, the mold resin portion collectively covers the circuit board, the terminal located outside the housing, and a portion of the housing, the housing and the mold resin portion include a welded portion formed by welding together constituent materials of the housing and the mold resin portion, and the welded portion is provided around an entire periphery of the housing and has a difference between a maximum width and a minimum width along a circumferential direction of the housing of 30% or less of the maximum width.

A method of manufacturing a connector apparatus according to the present disclosure includes: preparing an assembled article including a circuit board and a connector; forming an integrated article by covering a portion of the assembled article with a mold resin portion; and irradiating the integrated article with a laser, wherein the circuit board includes a conductor path, the connector includes a housing with a cylindrical shape and made of a resin, and a terminal projecting outward in an axial direction of the housing from inside the housing, the terminal being configured to connect to the conductor path, in the forming the integrated article, the circuit board, the terminal located outside the housing, and a portion of the housing are collectively covered by the mold resin portion, and in the irradiating with the laser, an entire periphery of the housing is irradiated with a laser all at once through the mold resin portion, and constituent materials of the housing and the mold resin portion are welded together.

DETAILED DESCRIPTION TO EXECUTE THE INVENTION

Technical Problem

Figure 1:
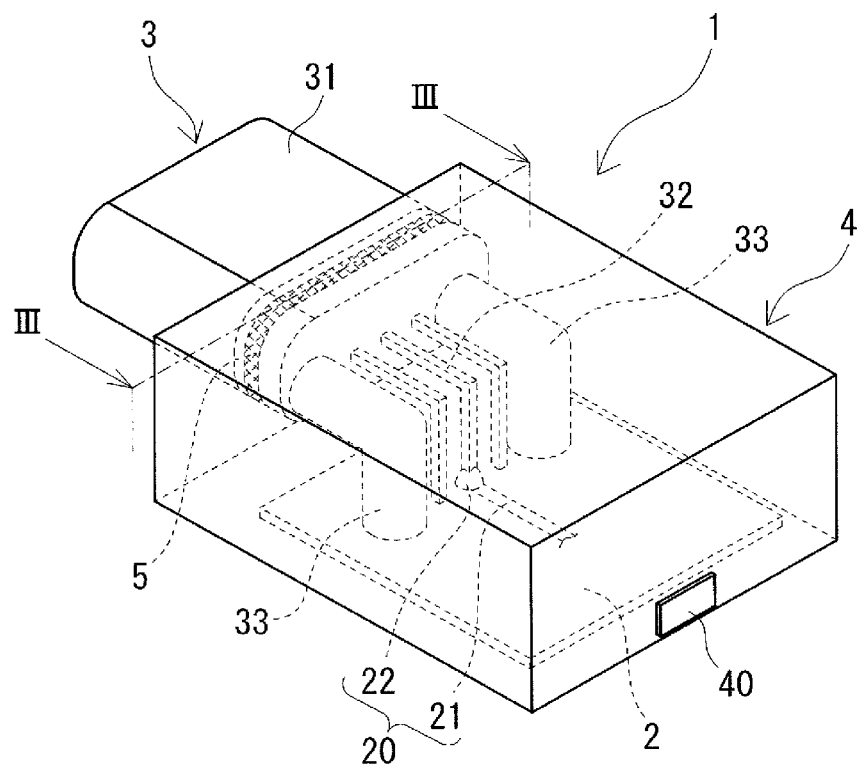
FIG. 1 is a perspective view schematically illustrating a connector apparatus according to an embodiment.

The connector apparatus described in Patent Document 1 is provided with a housing, giving it a large size. Also, the connector apparatus described in Patent Document 1 includes a sealant between the case and the cover that form the housing, ensuring good waterproof performance, but the number of parts is large and it tends to be complicated to manufacture.

An object of the present disclosure is to provide a connector apparatus with excellent waterproof performance. Also, an object of the present disclosure is to provide a method of manufacturing a connector apparatus for easily obtaining a connector apparatus that is compact and has excellent waterproof performance.

Effects of Present Disclosure

A connector apparatus according to the present disclosure is compact and easy to manufacture and also has excellent waterproof performance. A method of manufacturing a connector apparatus according to the present disclosure enables a connector apparatus that is compact and has excellent waterproof performance to be easily obtained.

Description of Embodiments

Firstly, embodiments of the present disclosure will be listed and described.

1. A connector apparatus according to an aspect of the present disclosure includes: a circuit board; a connector; and a mold resin portion, wherein the circuit board includes a conductor path, the connector includes a housing with a cylindrical shape and made of a resin, and a terminal projecting outward in an axial direction of the housing from inside the housing, the terminal being configured to connect to the conductor path; the mold resin portion collectively covers the circuit board, the terminal located outside the housing, and a portion of the housing, the housing and the mold resin portion include a welded portion formed by welding together constituent materials of the housing and the mold resin portion, and the welded portion is provided around an entire periphery of the housing and has a difference between a maximum width and a minimum width along a circumferential direction of the housing of 30% or less of the maximum width.

The connector apparatus of the present disclosure is provided with the welded portion provided around the entire periphery of the housing of the connector. Thus, the connector apparatus of the present disclosure has excellent adhesion between the housing and the mold resin portion around the entire periphery of the housing. This suppresses liquid such as water from entering in from gaps between the housing and the mold resin portion. By suppressing liquid from entering, liquid adhering to the conductive members, such as the circuit board and the terminal, covered by the mold resin portion can be suppressed.

In the welded portion, the difference between the maximum width and the minimum width in the circumferential direction of the housing is 30% or less of the maximum width. Thus, it can be said that the welded portion has little variation in the width in the circumferential direction of the housing. Having little variation in the width of the welded portion reduces the variation in the adhesive strength between the housing and the mold resin portion. When variation in adhesive strength is low, adhesion tends to be improved. In this manner, the connector apparatus of the present disclosure has excellent waterproof performance.

In the connector apparatus of the present disclosure, the conductive members, such as the circuit board and the terminal, are covered by the mold resin portion. Thus, the connector apparatus of the present disclosure does not need a housing to house the conductive members separately provided. Also, the connector apparatus of the present disclosure has excellent waterproof performance because of the welded portion described above, and thus a sealant does not need to be separately provided. Accordingly, with the connector apparatus of the present disclosure, the number of parts is low, the work to assemble the housing and dispose the sealant can be omitted, and manufacturability is excellent. In this manner, the connector apparatus of the present disclosure is compact and easy to manufacture.

2. For example, the connector apparatus of the present disclosure further includes four or more measurement points along the circumferential direction of the housing, wherein a ratio of the maximum width to an average width of the welded portion from the four or more measurement points is 130% or less, and a ratio of the minimum width to the average width is 70% or greater.

In this example, the width of the welded portion can be said to be uniform along the circumferential direction of the housing. When the welded portion has a uniform width, the adhesive strength between the housing and the mold resin portion tends to be uniform along the circumferential direction of the housing. Thus, this example has even better waterproof performance.

3. The connector apparatus of the present disclosure is an example wherein the housing includes a projection portion provided around an entire periphery, and the welded portion is provided on the projection portion.

The welded portion is, in a representative example, formed by laser welding. With laser welding, the housing is irradiated through the mold resin portion and heat is generated at the boundary surface between the housing and the mold resin portion, with this heat welding together the constituent materials of the housing and the mold resin portion. In this example, the mold resin portion allows the laser to pass through, and the housing absorbs the laser. The housing absorbs the laser and builds up heat, and this built up heat melts the constituent material of the housing. The melting heat from the housing transfers to the mold resin portion, causing heat to build up in the mold resin portion, and this built up heat melts the mold resin portion. The melted constituent material of the housing and the melted constituent material of the mold resin portion form the welded portion.

This example is provided with the welded portion on the projection portion. In other words, in this example, the welded portion is formed by heat being generated by at laser at the projection portion. By heating being generated at the projection portion, the heat tends to be concentrated at the projection portion, making a strong welded portion easy to form. Thus, this example has even better waterproof performance.

4. The connector apparatus according to the present disclosure is an example wherein a transmittance of the mold resin portion is 40% or greater, a transmittance of the mold resin portion is a ratio (b1/a1) between an amount of light a1 and an amount of light b1×100, the amount of light a1 is an amount of light of a laser with a wavelength of 940 nm; and the amount of light b1 is an amount of light of the laser passing through a test piece of constituent material of the mold resin portion with a thickness of 2 mm.

The welded portion is formed by laser welding, as described above. Because the transmittance of the mold resin portion is 40% or greater, the laser tends to not be absorbed by the mold resin portion and easily reaches the surface of the housing. Thus, in this example, heat tends to be generated by the laser at the boundary surface between of the housing and the mold resin portion, making the welded portion easy to form.

5. The connector apparatus according to the present disclosure is an example wherein a transmittance of the housing is 10% or less, a transmittance of the housing is a ratio (b2/a2) between an amount of light a2 and an amount of light b2×100; the amount of light a2 is an amount of light of a laser with a wavelength of 940 nm; and the amount of light b2 is an amount of light of the laser passing through a test piece of constituent material of the housing with a thickness of 2 mm.

The welded portion is formed by laser welding, as described above. Because the transmittance of the housing is 10% or less, the laser tends to be absorbed by the housing. Thus, in this example, heat tends to be generated by the laser at the boundary surface between of the housing and the mold resin portion, making the welded portion easy to form.

6. The connector apparatus according to the present disclosure is an example wherein the mold resin portion contains polyamide resin or polyester.

Polyamide resin has excellent mechanical strength. Thus, the mold resin portion containing polyamide resin can easily mechanically protect the members covered by the mold resin portion. Polyester is excellent in terms of electrical insulating properties, water resistance, and the like. Thus, the mold resin portion containing polyester can easily electrically and chemically protect the members covered by the mold resin portion.

7. The connector apparatus according to the present disclosure is an example wherein the housing contains polyester.

In this example, the terminal is easily electrically and chemically protected.

8. The connector apparatus according to the present disclosure is an example wherein the mold resin portion and the housing both contain polyester.

In this example, because the mold resin portion and the housing contain the same type of resin, the solubility parameter of the mold resin portion and the housing can be brought close to one another. Thus, in this example, the conformability between the mold resin portion and the housing is good. Thus, this example has even better waterproof performance. Also, in this example, by the welded portion described below containing the same type of resin, the strength of the welded portion tends to be increased. Thus, in this example, the adhesion between the housing and the mold resin portion is further increased.

9. The connector apparatus of the present disclosure is an example wherein the mold resin portion includes a surface that comes into contact with atmosphere.

In this example, the surface of the mold resin portion is located on the outermost layer. In other words, in this example, a housing that houses the circuit board and the like is not provided. Thus, this example is easy to make compact.

10. The connector apparatus of the present disclosure is an example wherein the mold resin portion is an injection molded body.

The injection molded body can be manufactured via injection molding. Injection molding includes filling a molding mold with the constituent material of the mold resin portion while under pressure and covering the circuit board, the housing, and the like. Compared to casting, injection molding tends to completely fill up the molding mold with the constituent material of the mold resin portion. Thus, this example tends to not have gaps between the circuit board, the housing, and the like and the mold resin portion. Because gaps tend to not be formed, droplets tend to not form due to condensation of the water vapor inside the gaps. Also, because this example is manufactured via injection molding, the mold resin portion has excellent flexibility in terms of shape.

11. The connector apparatus according to the present disclosure is an example wherein the circuit board and the connector form a control unit.

Because this example has excellent waterproof performance between the housing and the mold resin portion, it can be used for an extended period of time. Thus, this example is suitable to be used as a control unit. Also, because this example is compact, it is suitable to be used as a control unit.

12. A method of manufacturing a connector apparatus according to an aspect of the present disclosure includes: preparing an assembled article including a circuit board and a connector; forming an integrated article by covering a portion of the assembled article with a mold resin portion; and irradiating the integrated article with a laser, wherein the circuit board includes a conductor path, the connector includes a housing with a cylindrical shape and made of a resin, and a terminal projecting outward in an axial direction of the housing from inside the housing, the terminal being configured to connect to the conductor path, in the forming the integrated article, the circuit board, the terminal located outside the housing, and a portion of the housing are collectively covered by the mold resin portion, and in the irradiating with the laser, an entire periphery of the housing is irradiated with a laser all at once through the mold resin portion, and constituent materials of the housing and the mold resin portion are welded together.

In the method of manufacturing a connector apparatus according to the present disclosure, the entire periphery of the housing of the connector is irradiated all at once. Hereinafter, this method of laser irradiation is referred to as all at once irradiation. Example of laser irradiation other than all at once irradiation include laser irradiation while scanning around the circumferential direction of the housing. Hereinafter, this method of laser irradiation is referred to as scanning irradiation.

Laser welding generates heat at the boundary surface between the housing and the mold resin portion. In the case of at all once irradiation, the heat generated at the boundary surface tends to be substantially uniform across all sections. Thus, in the case of all at once irradiation, regarding the welded portion formed by welding together the constituent materials of the housing and the mold resin portion, the welded portion can be formed with a small amount of variation in the width. Specifically, a welded portion with a difference between the maximum width and the minimum width in the circumferential direction of the housing of 30% or less can be formed around the entire periphery of the housing. In the case of scanning irradiation, because the heat generated at the boundary surface described above transfers in the scanning direction, the heat tends to be non-uniform. In the case of scanning irradiation, a welded portion tends to be formed that is formed as the scanning proceeds, with the width increasing as the scanning proceeds.

In the case of collective irradiation, a plurality of emitting ports of the laser are arranged in a line along the circumferential direction of the housing and laser is simultaneously emitting from the plurality of emitting ports of the laser, for example. The emitting ports of the laser are arranged so that the laser spots are in line and evenly spaced along the circumferential surface of the housing. Thus, in the case of all at once irradiation, the laser irradiation apparatus is easily made compact. On the other hand, in the case of scanning irradiation, a laser emitting port need to be made scan along the circumferential direction of the housing. Thus, in the case of scanning irradiation, a mechanism for making the laser emitting port scan is required, increasing the size of the apparatus.

In this manner, the method of manufacturing a connector apparatus of the present disclosure using all at once irradiation and easily obtains a connector apparatus provided with a welded portion.

13. The method of manufacturing a connector apparatus according to the present disclosure is an example wherein the irradiating with the laser is performed with the mold resin portion pressed against the housing side.

By the mold resin portion being pressed against the housing side, gaps tend to not form between the housing and the mold resin portion. By emitting the laser with essentially no gaps between the housing and the mold resin portion, the constituent material of the housing and the mold resin portion easily weld together, which tends to improve the adhesion between the housing and the mold resin portion.

Description of Embodiments

Embodiments of the present disclosure will be described in detail below with reference to the drawings. Components with the same name are given the same reference numeral.

Connector Apparatus

Figure 2:
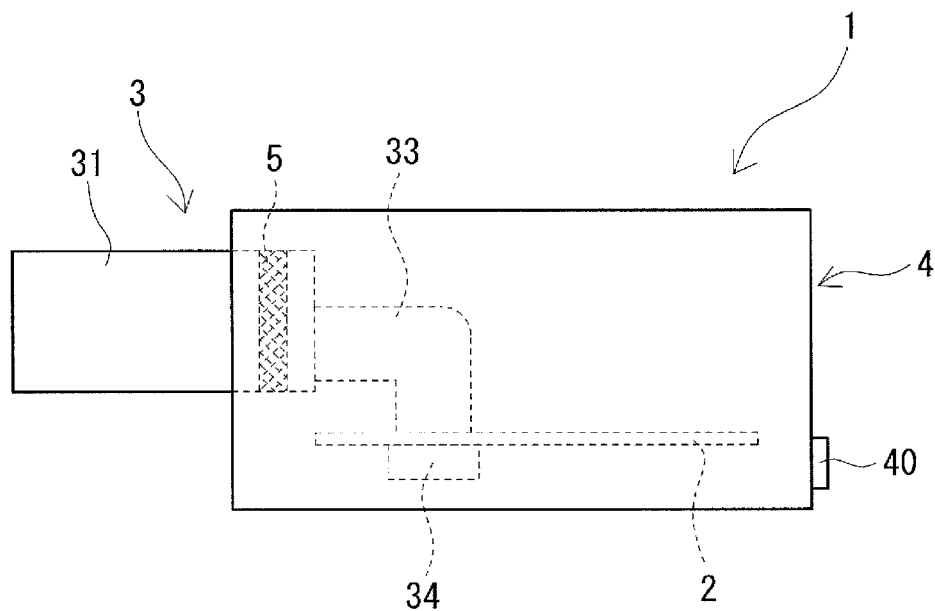
FIG. 2 is a side view schematically illustrating a connector apparatus according to an embodiment.

A connector apparatus 1 of this embodiment is provided with a circuit board 2 and a connector 3 as illustrated in FIGS. 1 and 2. The circuit board 2 is provided with a conductor path 20. The connector 3 is provided with a housing 31 and a terminal 32. The housing 31 is made of resin and has a cylindrical shape. The terminal 32 projects outward from the housing 31 in the axial direction and connects to the conductor path 20. The connector apparatus 1 of this embodiment is advantageous in that it is provided with the mold resin portion 4 that collectively covers the circuit board 2, the terminal 32 located outside of the housing 31, and a portion of the housing 31. Also, the connector apparatus 1 of this embodiment is advantageous in that it is provided with a welded portion 5 provided around the entire periphery of the housing 31. The welded portion 5 is, in a representative example, formed by laser welding. The welded portion 5 is configured by welding together constituent material of the housing 31 and the mold resin portion 4 using heat from a laser. The configurations will be described in detail below. In the drawings, the welded portion 5 is indicated by cross hatching.

Circuit Board

The circuit board 2 is a plate-like member on which electronic components (not illustrated) such as a semiconductor relay, the connector 3, and the like are mounted. A printed circuit board may be used as the circuit board 2. The circuit board 2 is provided with the conductor path 20. The conductor path 20 refers to a section of a conductive member forming the electric circuit of the circuit board 2 that is exposed from the surface. The conductor path 20, for example, includes a conductive pattern 21 of the circuit board 2, a terminal (not illustrated) of an electronic component mounted on the circuit board 2, and a solder 22 connecting the terminal of the electronic component, the terminal 32 of the connector 3, and the conductive pattern 21. The circuit board 2 is embedded in the mold resin portion 4 described below.

Connector

The connector 3 is a connection member to which a counterpart connector (not illustrated) is connected. The counterpart connector is connected to an in-vehicle electrical component or the like via a wire harness. The connector 3 is mounted on the circuit board 2. The connector 3 is provided with the housing 31 and the terminal 32. The connector 3 is further provided with an attachment portion 33 and a fixing member 34 (FIG. 2). The connector 3 is disposed with a gap between it and the extended surface of the circuit board 2. The connector 3 illustrated in FIGS. 1 and 2 is disposed above the circuit board 2.

Housing

The housing 31 is a tube-shaped member into which the counterpart connector fits. The housing 31 is a closed-bottom cylinder that is open on the side where the counterpart connector fits into and closed on the side opposite the open side. The terminal 32, described below, extends through the closed surface. In other words, the terminal 32 runs from inside the housing 31 to outside the housing 31, through the closed surface. Hereinafter, the closed surface may also be referred to the closed end surface. The terminal 32 located outside of the housing 31 projects from the closed end surface. The closed end surface of the housing 31 and the area nearby are embedded in the mold resin portion 4 described below around the entire periphery.

In the present example, the cross-sectional shape of the housing 31 is a stadium. The cross-section of the housing 31 is a cross-section taken along a direction orthogonal to the axial direction of the housing 31. A stadium shape refers to a shape with two arc portions joined at both ends of a pair of parallel linear portions of the same length.

Transmittance

The housing 31 preferably has low transmittance. The transmittance of the housing 31 is a percentage (b2/a2)×100, where a2 is the amount of light of laser with a wavelength of 940 nm and b2 is the amount of light of the laser having passed through a test piece of the constituent material of the housing 31 with a thickness of 2 mm. The housing 31 with low transmittance easily absorbs the laser. In other words, the housing 31 with low transmittance is easily melted by the laser. Thus, the welded portion 5 described below is easy to form. The transmittance of the housing 31 is preferably 10% or less, for example. The housing 31 with a transmittance of 10% or less easily absorbs the laser and is easily melted, making the welded portion 5 easy to form. The transmittance of the housing 31 is more preferably 7% or less, and particularly preferably 5% or less. The color of the housing 31 is preferably an opaque black, gray, or similar color. These colors easily absorb the laser.

Material

The housing 31 preferably contains polyester, for example. Polyester is excellent in terms of electrical insulating properties, water resistance, and the like. Thus, the housing 31 containing polyester can mechanically, electrically, and chemically protect the terminal 32 and the like inside the housing 31. A representative example of polyester includes polybutylene terephthalate (PBT). The housing 31 also preferably further contains a coloring agent. An example of a coloring agent is an agent that lowers the transmittance of the housing 31. Carbon black is an example of a coloring agent. By adding carbon black, the color of the housing 31 can easily be made black.

Terminal

The terminal 32 electrically connects the counterpart connector and the circuit board 2. The terminal 32 runs from inside the housing 31 to outside the housing 31, through the closed end surface of the housing 31. The portion of the terminal 32 located inside the housing 31 is disposed aligned with the axial direction of the housing 31. The end of the terminal 32 located inside the housing 31 is electrically connected to the counterpart connector. The portion of the terminal 32 located outside the housing 31 is bent to extend toward the circuit board 2. The terminal 32 of the present example is made of a metal wire bent at essentially a right angle. The other end of the terminal 32 located outside the housing 31 is electrically connected to the conductive pattern 21 of the circuit board 2. The solder 22 is used to electrically connect this end of the terminal 32 and the conductive pattern 21. The terminal 32 may be a press-fit terminal. In this case, the terminal 32 is electrically connected to the conductive pattern 21 via pressure. Thus, in a case in which the terminal 32 is a press-fit terminal, the solder 22 can be omitted. The other end of the terminal 32 extends through the circuit board 2. The terminal 32 located outside the housing 31 is embedded in the mold resin portion 4.

Attachment Portion

The attachment portion 33 is integrally formed with the housing 31. In the present example, the attachment portion 33 is integrally formed as a portion of the housing 31. The attachment portion 33 bends in an L-shape from the closed end surface of the housing 31 extending toward the circuit board 2. The attachment portion 33 of the present example is made of a cylindrical rod member bent at essentially a right angle. In the present example, two attachment portions 33 are provided on either side of the terminal 32. A threaded hole is provided in the end surface of the attachment portion 33. The fixing member 34 described below is attached to the threaded hole. By sandwiching the circuit board 2 between the end surface of the attachment portion 33 and the fixing member 34, the circuit board 2 and the housing 31 are fixed together. The attachment portion 33 is embedded in the mold resin portion 4.

Fixing Member

The fixing member 34 fixes the housing 31 to the circuit board 2. As the fixing member 34, for example, a screw may be used. The fixing member 34 of the present example is a screw made of resin. In the present example, two fixing members 34 extend through insertion holes (not illustrated) provided in the circuit board 2 and are attached to the attachment portions 33. By attaching the fixing members 34 to the attachment portions 33, the housing 31 is fixed to the circuit board 2. A portion of the fixing member 34 is exposed from the surface of the circuit board 2. The fixing member 34 is embedded in the mold resin portion 4.

Mold Resin Portion

The mold resin portion 4 mechanically, electrically, and chemically protects the conductive members, such as the circuit board 2 and the terminal 32, from the external environment. The mold resin portion 4 collectively covers the circuit board 2, the terminal 32 located outside of the housing 31, and a portion of the housing 31. In the present example, the mold resin portion 4 collectively covers the circuit board 2 and a large portion of the connector 3. A large portion of the connector 3 refers to the region excluding the end portion of the housing 31 on the open side where the counterpart connector is fit into.

The mold resin portion 4 includes a surface that comes into contact with the atmosphere. Coming into contact with the atmosphere means being exposed without the connector apparatus 1 being covered by a case or the like, and this refers to the outermost surface of the connector apparatus 1. In the present example, the surface of the mold resin portion 4 comes into contact with the atmosphere all over. In other words, the connector apparatus 1 is caseless. This gives the connector apparatus 1 a compact size.

Transmittance

The mold resin portion 4 preferably has a high transmittance. The transmittance of the mold resin portion 4 is a percentage $(b1/a1) \times 100$, where $a1$ is the amount of light of laser with a wavelength of 940 nm and $b1$ is the amount of light of the laser having passed through a test piece of the constituent material of the mold resin portion 4 with a thickness of 2 mm. The mold resin portion 4 with a high transmittance tends to not absorb the laser, allowing the laser to easily reach the housing 31. Thus, the welded portion 5 described below is easy to form. The transmittance of the mold resin portion 4 is preferably 40% or greater, for example. The mold resin portion 4 with a transmittance of 40% or greater tends to allow the laser to pass through, making the welded portion 5 easy to form. The transmittance of the mold resin portion 4 is more preferably 45% or greater, and particularly preferably 50% or greater. The color of the mold resin portion 4 is preferably colorless and transparent, white and transparent, and opaque white, or the like. These colors tend to allow the laser to pass through.

Material

The mold resin portion 4 preferably contains polyamide resin or polyester, for example. Polyamide resin has excellent mechanical strength. Thus, the mold resin portion 4 containing polyamide resin can easily mechanically protect the members covered by the mold resin portion 4. Polyester is excellent in terms of electrical insulating properties, water resistance, and the like. Thus, the mold resin portion 4 containing polyester can easily electrically and chemically protect the members covered by the mold resin portion 4.

The housing 31 and the mold resin portion 4 preferably contain the same type of resin. Particularly, the housing 31 and the mold resin portion 4 are preferably made of the exact same resin. By configuring the housing 31 and the mold resin portion 4 to contain the same type of resin, the solubility parameter of the housing 31 and the mold resin portion 4 can be brought close to one another. Accordingly, good conformability between the housing 31 and the mold resin portion 4 can be achieved. Also, by the welded portion 5 described below containing the same type of resin, the strength of the welded portion 5 tends to be increased. Thus, the adhesion between the housing 31 and the mold resin portion 4 is further increased. For example, in a case in which the housing 31 contains polyester, the mold resin portion 4 preferably contains polyester.

The mold resin portion 4 is preferably an injection molded body. An injection molded body can be manufactured via injection molding. Injection molding includes filling a molding mold with the constituent material of the mold resin portion 4 while under pressure and covering the circuit board 2, the housing 31, and the like. Compared to casting, injection molding tends to completely fill up the molding mold with the constituent material of the mold resin portion 4. Thus, compared to a casting molded body, an injection molded body tends to not have gaps between the circuit board 2, the housing 31, and the like and the mold resin portion 4. Because gaps tend to not be formed, droplets tend to not form due to condensation of the water vapor inside the gaps. Also, an injection molded body has excellent flexibility in terms of the shape of the mold resin portion 4. In the present example, the mold resin portion 4 is configured as a quadrangular prism.

The constituent material of the mold resin portion 4 preferably has a melting point ranging from 180° C. to 200° C. By the constituent material having a melting point of 180° C. or greater, deformation due to the mold resin portion 4 melting when the connector apparatus 1 is used can be prevented. Also, by the constituent material having a melting point of 200° C. or less, the molding temperature for the injection molding can be set to 200° C. or less, and at this molding temperature, the solder 22 and the like can be prevented from melting.

The mold resin portion 4 is an injection molded body and thus is provided with a trace portion 40 of a gate. The trace portion 40 is a section corresponding to a gate for filling the cavity of the mold with the constituent material of the mold resin portion 4 when molding the mold resin portion 4. An attachment portion including a portion corresponding to the gate is formed on the mold resin portion 4 manufactured by injection molding. When the attachment portion is removed, the trace portion 40 of the gate is formed on the mold resin portion 4. The attachment portion, in addition to including a portion corresponding to a gate, may include a portion corresponding to a spray and may further include a portion corresponding to a runner. The attachment portion is removed by snapping off the attachment portion, for example. Because the terminal 32 and the like are disposed at or near the housing 31, the gate using for injection molding is preferably set at a position distanced from the housing 31. Accordingly, the trace portion 40 is preferably provided on the mold resin portion 4 on the opposite side to the housing 31.

Welded Portion

Figure 3:
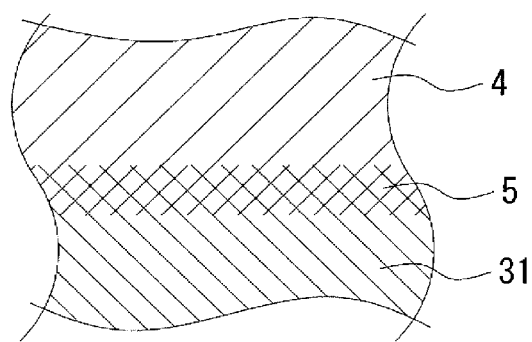
FIG. 3 is a cross-sectional view taken along in FIG. 1.

As illustrated in FIG. 3, the welded portion 5 is formed by welding together the constituent material of the housing 31 and the mold resin portion 4. Welding refers to welding that satisfies at least one of: mixing constituent materials together, melting constituent materials together, using shear force to cause material failure not interfacial failure, or roughening the surface of the connector 3. Interfacial failure refers to a failure at the interface between the housing 31 and the mold resin portion 4. This means separation along the interface between the housing 31 and the mold resin portion 4. Accordingly, the constituent material of one member, either the housing 31 or the mold resin portion 4, does not adhere to that of the other member. Material failure refers to a failure inside one member, either the housing 31 or the mold resin portion 4. This means that both members separate with the constituent material of one member being adhered at the surface of the other member that faces the one member. The welded portion 5 increases the adhesion between the housing 31 and the mold resin portion 4.

The welded portion 5 is provided around the entire periphery of the housing 31. Thus, liquid such as water entering in from the space between the housing 31 and the mold resin portion 4 can be suppressed. Accordingly, liquid adhering to the conductive members, such as the circuit board 2 and the terminal 32, can be suppressed.

In the welded portion 5, the difference between the maximum width and the minimum width in the circumferential direction of the housing 31 is 30% or less of the maximum width. Thus, it can be said that the welded portion 5 has little variation in the width in the circumferential direction of the housing 31. Having little variation in the width of the welded portion 5 reduces the variation in the adhesive strength between the housing 31 and the mold resin portion 4. The ratio of the difference to the maximum width of the welded portion 5 in the circumferential direction of the housing 31 may be referred to as the width ratio. The width ratio of the welded portion 5 is obtained by separating the housing 31 and the mold resin portion 4 and exposing the welded portion 5 and measuring the width of the welded portion 5 along the circumferential direction of the housing 31. The housing 31 and the mold resin portion 4 can be separated using an appropriate tool such as pliers to separate the mold resin portion 4 from the housing 31, for example. The width ratio of the welded portion 5 is more preferably 20% or less, and particularly preferably 10% or less.

The welded portion 5 is preferably measured using a plurality of, specifically four or more, measurement points along the circumferential direction of the housing 31, with the ratio of the maximum width to the average width of the welded portion 5 from the plurality of measurement points being 130% or less, and the ratio of the minimum width to the average width being 70% or greater. The ratio of the maximum width to the average width of the welded portion 5 is referred to as the maximum width ratio. The ratio of the minimum width to the average width of the welded portion 5 is referred to as the minimum width ratio. When the maximum width ratio is 130% or less and the minimum width ratio is 70% or greater, the width of the welded portion 5 can be said to be uniform along the circumferential direction of the housing 31. When the welded portion 5 has a uniform width, the adhesive strength between the housing 31 and the mold resin portion 4 tends to be uniform along the circumferential direction of the housing 31. The maximum width ratio of the welded portion 5 is more preferably 120% or less, and particularly preferably 110% or less. The minimum width ratio of the welded portion 5 is more preferably 80% or greater and particularly preferably 90% or greater. The welded portion 5 preferably has a maximum width ratio of 120% or less and a minimum width ratio of 80% or greater. Particularly, the welded portion 5 preferably has a maximum width ratio of 110% or less and a minimum width ratio of 90% or greater. Note that the maximum width ratio of the welded portion 5 may be 105% or less, and the minimum width ratio may be 95% or greater.

Application

The connector apparatus 1 of this embodiment can be suitably used in an engine control unit of a vehicle, a module of an electric brake system of a vehicle, and the like. An example of an engine control unit includes a fuel injection engine control unit (FI-ECU), for example. Examples of an electric brake system module include an electro mechanical brake (EMB) and an electronic parking break (EPB) module.

Method of Manufacturing a Connector Apparatus

The method of manufacturing a connector apparatus according to this embodiment includes a process of preparing an assembled article, a process of forming an integrated article, and a process of irradiating using a laser. The method of manufacturing of a connector apparatus will be described in detail below with reference to FIGS. 4 to 6.

Process of Preparing an Assembled Article

Figure 4:
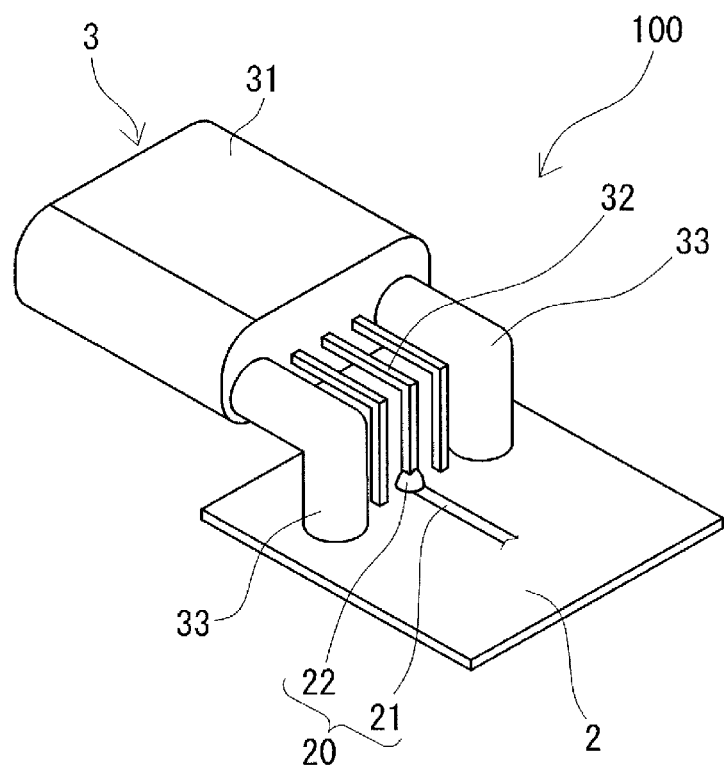
FIG. 4 is a perspective view schematically illustrating an assembled article prepared in a method of manufacturing a connector apparatus according to an embodiment.

In the process of preparing an assembled article, as illustrated in FIG. 4, an assembled article 100 in which the circuit board 2 and the connector 3 described above are connected together is prepared. In the assembled article 100, the conductive pattern 21 of the circuit board 2 and the terminal 32 of the connector 3 are electrically connected by the solder 22. Also, in the assembled article 100, the attachment portions 33 of the connector 3 are fixed to the circuit board 2 via the fixing members 34 (FIG. 2). In the present example, the cross-sectional shape of the housing 31 of the connector 3 is a stadium.

Process of Forming an Integrated Article

Figure 5:
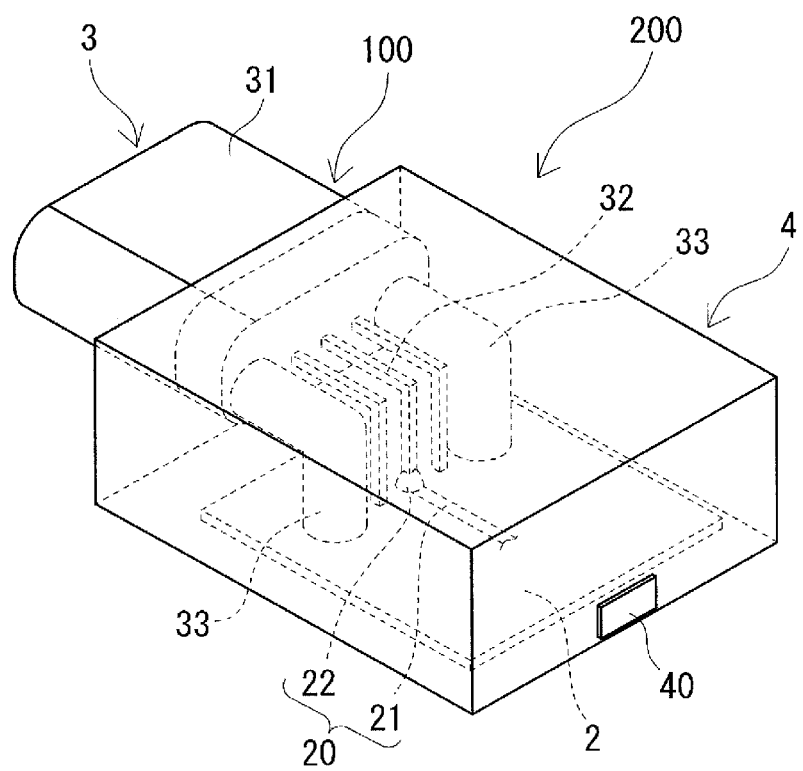
FIG. 5 is a perspective view schematically illustrating an integrated article obtained by covering a portion of the assembled article with a mold resin portion in a method of manufacturing a connector apparatus according to an embodiment.

In the process of forming an integrated article, as illustrated in FIG. 5, an integrated article 200 is manufactured by covering a portion of the assembled article 100 with the mold resin portion 4. Specifically, in the process of forming an integrated article, the mold resin portion 4 collectively covers the circuit board 2, the terminal 32 located outside of the housing 31 of the connector 3, and a portion of the housing 31. In other words, in the process of forming an integrated article, the mold resin portion 4 covers a large portion of the assembled article 100 excluding the opening of the housing 31 of the connector 3 where the counterpart connector is fit into. In the present example, the mold resin portion 4 is configured as a quadrangular prism. Accordingly, the mold resin portion 4 surrounds the housing 31 with four sides.

Process of Irradiating Using a Laser

In the process of irradiating using a laser, the housing 31 is collectively irradiated with a laser via the mold resin portion 4 to weld the constituent materials of the housing 31 and the mold resin portion 4 together. An example of laser irradiation includes irradiating from outside the mold resin portion 4 in a normal line direction of the outer circumferential surface of the housing 31. The mold resin portion 4 allows the laser to pass through, and the housing 31 absorbs the laser. The housing 31 absorbs the laser and builds up heat, and this built up heat melts the constituent material of the housing 31. The melting heat from the housing 31 transfers to the mold resin portion 4, causing heat to build up in the mold resin portion 4, and this built up heat melts the mold resin portion 4. The housing 31 and the mold resin portion 4 solidify with the melted constituent material of the housing 31 and the melted constituent material of the mold resin portion 4 adhered together to form the welded portion 5.

The laser irradiation is performed collectively around the entire periphery of the housing 31. In the case of collective irradiation, a plurality of emitting ports of the laser are arranged in a line along the circumferential direction of the housing 31 and laser is simultaneously emitting from the plurality of emitting ports of the laser.

The emitting ports of the laser are arranged so that the laser spots are in line and evenly spaced along the circumferential surface of the housing 31. Adjacent laser spots preferably slightly overlap one another. There may be a gap between adjacent laser spots, but the gaps are preferably sufficiently small.

In a representative example, the laser spots are circles. The emitting ports of the laser are preferably arranged so that the center of the laser spots on the circumferential surface of the housing 31 are located on the same straight line. Also, the emitting ports of the laser are preferably disposed so that, in the overlapping region of adjacent laser spots on the circumferential surface of the housing 31, the maximum length of the laser spot in the aligned direction ranges from $1/8$ times to $1/2$ times the spot diameter of the laser. By setting the maximum length in the overlapping region to $1/8$ times the spot diameter of the laser or greater, the laser can be reliably emitted around the entire periphery of the housing 31. Also, by setting the maximum length in the overlapping region to $1/2$ times the spot diameter of the laser or less, an excessive number of laser emitting ports is not necessary.

Examples of the type of the laser source include a solid-state laser, a semiconductor laser, a fiber laser, and the like.

The wavelength of the laser ranges, for example, from 800 nm to 990 nm, preferably from 850 nm to 990 nm, and particularly preferably from 930 nm to 950 nm. A suitable wavelength of the laser is 940 nm. The output of the laser depends on the material of the housing 31 and the mold resin portion 4 but ranges, for example, from 10 W to 100 W, preferably from 20 W to 90 W, and particularly preferably from 30 W to 60 W.

The laser is preferably emitted with the mold resin portion 4 pressed against the housing 31 side. By the mold resin portion 4 being pressed against the housing 31 side, gaps tend to not form between the housing 31 and the mold resin portion 4. By emitting the laser with essentially no gaps between the housing 31 and the mold resin portion 4, the constituent material of the housing 31 and the mold resin portion 4 easily weld together, which tends to improve the adhesion between the housing 31 and the mold resin portion 4.

Figure 6:
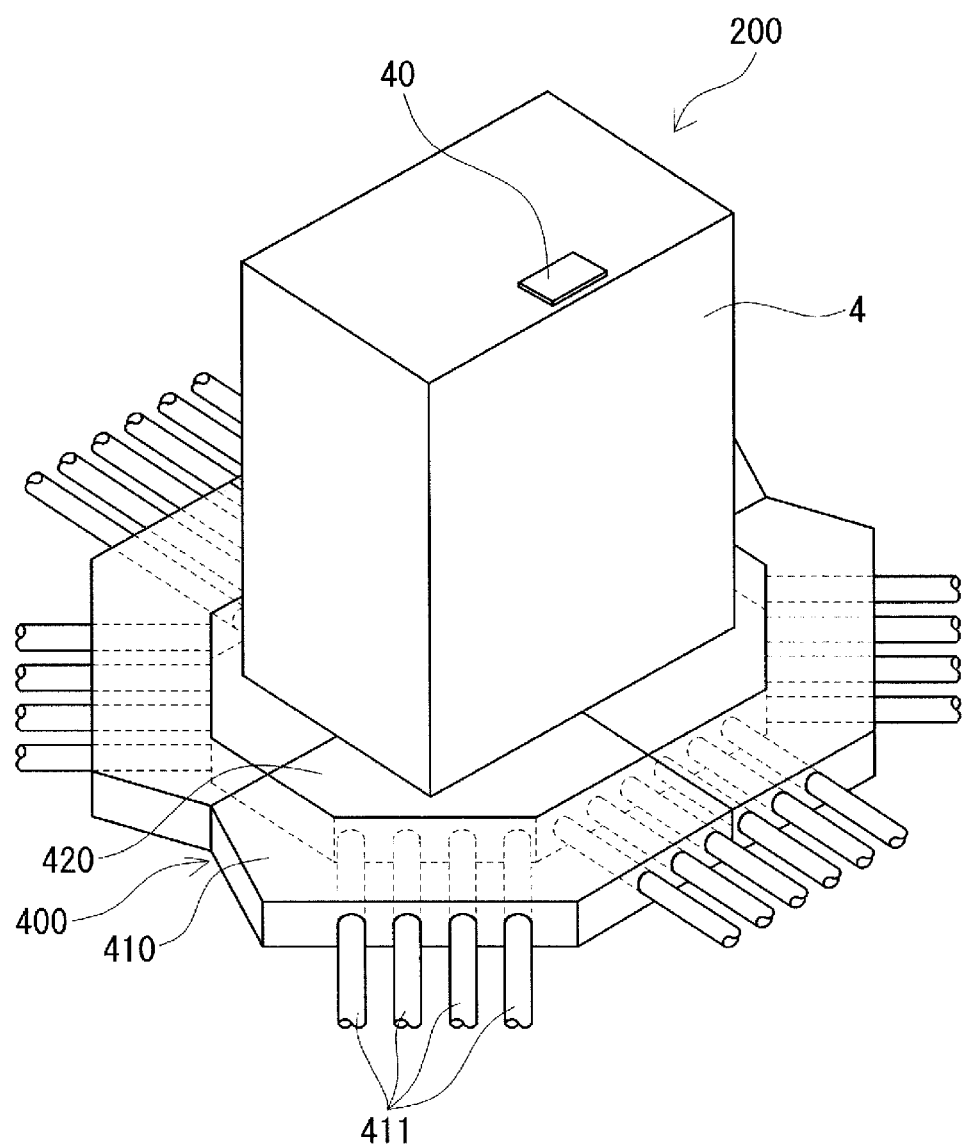
FIG. 6 is an explanatory diagram for describing a process of irradiating an integrated article with a laser in a method of manufacturing a connector apparatus according to an embodiment.

The entire periphery of the housing 31 is irradiated with the laser all at once with the mold resin portion 4 pressed against the housing 31 side using a pressing apparatus 400 such as that illustrated in FIG. 6, for example. The pressing load from the pressing apparatus 400 ranges from 1 kgf to 10 kgf, for example. By the pressing load being 1 kgf or greater, gaps tend to not form between the housing 31 and the mold resin portion 4. Also, by the pressing load being 10 kgf or less, deformation of the mold resin portion 4 due to excessive pressure on the connector apparatus 1 can be suppressed. The pressing load preferably ranges from 2 kgf to 8 kgf, and particularly preferably from 3 kgf to 5 kgf, for example.

The pressing apparatus 400 is a tube-shaped member disposed around the periphery of the mold resin portion 4. The pressing apparatus 400 has an inner circumferential shape that corresponds to the external shape of the mold resin portion 4. In the present example, the inner circumferential shape of the pressing apparatus 400 is quadrangular.

The pressing apparatus 400 is configured of a plurality of divided pieces divided in the circumferential direction. In the present example, the pressing apparatus 400 is configured of four divided pieces. Each divided piece is configured to press against a corner portion of the mold resin portion 4.

The pressing apparatus 400 is provided with a metal portion 410 located on the outer circumferential side and a glass portion 420 located on the inner circumferential side. The metal portion 410 is provided with the plurality of laser emitting ports along the circumferential direction of the pressing apparatus 400. Specifically, optical fibers 411 running from the outer circumferential surface to the inner circumferential surface extend through the metal portion 410, with the distal ends of the optical fibers 411 corresponding to the laser emitting ports. The laser emitting ports are provided flush with the inner circumferential surface of the metal portion 410. The glass portion 420 comes into direct contact with the mold resin portion 4. The laser emitted from the emitting ports travels through the glass portion 420, irradiates the outer side of the mold resin portion 4, passes through the mold resin portion 4, and is absorbed by the housing 31. The optical fibers 411 and the emitting ports are disposed so that the interval between the laser spots on the housing 31 are even. In the present example, the cross-sectional shape of the housing 31 is a stadium. Thus, the optical fibers 411 and the emitting ports are disposed so that the laser is emitted in a normal line direction to the outer circumferential surface at the linear portions and the arc portions forming the outer circumferential surface of the housing 31.

Effect

The connector apparatus 1 of this embodiment can achieve the following effects.

1. Excellent Waterproof Performance

Because the adhesion between the housing 31 and the mold resin portion 4 is excellent due to the welded portion 5, liquid entering in from the gaps between the housing 31 and the mold resin portion 4 can be easily suppressed. In particular, because the welded portion 5 formed around the entire periphery of the housing 31 has little variation in terms of width, the welded portion 5 can easily be formed strong. Thus, liquid adhering to the conductive members, such as the circuit board 2 and the terminal 32, covered by the mold resin portion 4 can be suppressed.

2. Easy to Make Compact

By collectively covering the conductive members, such as the circuit board 2 and the terminal 32, with the mold resin portion 4, a housing for housing the circuit board 2 does not need to be separately provided. Because a housing is not provided, there is also no need for a sealant to waterproof gaps between the housing.

3. Easy to Manufacture

The connector apparatus 1 of this embodiment has excellent waterproof performance due to the welded portion 5 described above, and a housing and a sealant are not required. Thus, the number of parts is low and the work to assemble a housing or dispose a sealant can be omitted. In particular, because the welded portion 5 is formed using laser irradiation all at once around the entire periphery of the housing 31, variation in the width of the welded portion 5 can be easily reduced, making the laser irradiation apparatus easy to make compact.

Modified Example

Figure 7:
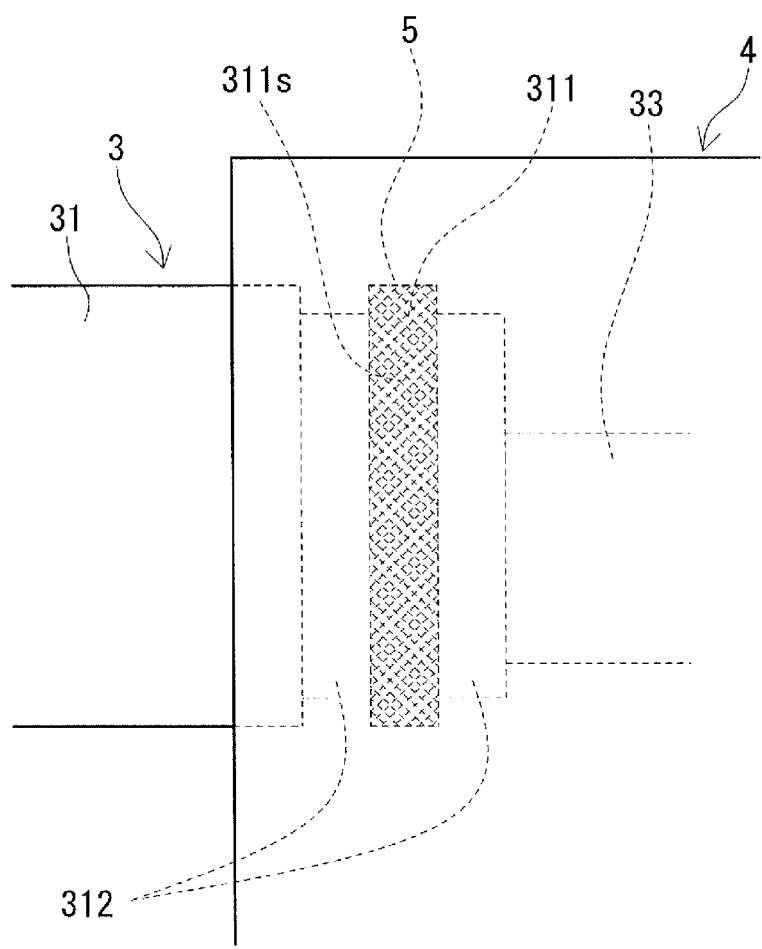
FIG. 7 is a partial side view schematically illustrating a connector apparatus according to a modified example.

As illustrated in FIG. 7, the connector apparatus 1 described above can be provided with a projection portion 311 on the housing 31. The projection portion 311 is provided around the entire periphery of the housing 31 that comes into contact with the mold resin portion 4. In a case in which the projection portion 311 is provided, the welded portion 5 is provided on the projection portion 311. Hereinafter, the description will focus mainly on the projection portion 311, which is a point of difference with the connector apparatus 1 described above, and description of redundant matters will be omitted.

The projection portion 311 has the function of absorbing the laser heat in a concentrated manner when the welded portion 5 is formed. The shape and dimensions of the projection portion 311 do not substantially change from before to after the laser welding.

The shape of the projection portion 311 can be appropriately selected to allow the projection portion 311 to absorb the laser heat in a concentrated manner. The projection portion 311 is preferably provided with a distal end surface 311s that runs parallel with the axial direction of the housing 31. By the projection portion 311 being provided with the distal end surface 311s, the surface of the projection portion 311 that receives the laser can be easily stabilized and secured. Also, by the projection portion 311 being provided with the distal end surface 311s, the region where laser heat is produced can be provided on the distal end side of the projection portion 311, and the heat is easily suppressed from transferred to the base end side of the projection portion 311.

The cross-sectional shape of the projection portion 311 is not particularly limited. The cross-sectional shape of the projection portion 311 may be quadrangular, for example. The cross-sectional shape of the projection portion 311 is a shape with a cross-section taken along a direction orthogonal to the extending direction of the projection portion 311. The extending direction of the projection portion 311 is the radial direction of the housing 31. The projection portion 311 may extend along the circumferential direction of the housing 31 by being provided along the circumferential direction of the housing 31 or may have a wave shape or the like that bends away from the circumferential direction of the housing 31. In a case in which the cross-sectional shape of the projection portion 311 is quadrangular, the shape of the projection portion 311 is simple, making the adhesion between the projection portion 311 and the mold resin portion 4 easy to improved. Also, the projection portion 311 having a quadrangular cross-sectional shape makes manufacture of the projection portion 311 simple. The cross-sectional shape of the projection portion 311 may be triangular. Also, the cross-sectional shape of the projection portion 311 may be a semi-circular shape with the distal end surface 311s having an arc-shaped surface. The cross-sectional shape of the projection portion 311 may be trapezoidal. The cross-sectional shape of the projection portion 311 may be an inverted trapezoid with the width decreasing from the distal end side to the base end side.

The maximum width of the projection portion 311 preferably ranges from 1 mm to 2 mm or less. By the maximum width of the projection portion 311 being 1 mm or greater, the surface that receives the laser can be easily secured, and the laser heat is easily concentrated at the projection portion 311. Also, by the maximum width of the projection portion 311 being 2 mm or less, though this depends on the intensity distribution of the laser, the laser heat is easily concentrated at the projection portion 311. The maximum width of the projection portion 311 more preferably ranges from 1 mm to 1.7 mm, and particularly preferably from 1 mm to 1.5 mm.

The maximum height of the projection portion 311 preferably ranges from 0.2 mm to 0.5 mm By the maximum height of the projection portion 311 being 0.2 mm or greater, the region where laser heat is produced can be provided on the distal end side of the projection portion 311, and the heat is easily suppressed from transferred to the base end side of the projection portion 311. Also, by the maximum height of the projection portion 311 being 0.5 mm or less, the diffusion of heat by the laser can be made constant, and the constituent material of the projection portion 311 can be melted in a constant manner. The maximum height of the projection portion 311 more preferably ranges from 0.2 mm to 0.4 mm, and particularly preferably from 0.2 mm to 0.3 mm.

The connector apparatus 1 of the present example is provided with a plurality of recess portions 312 on the housing 31. The recess portions 312 are each provided around the entire periphery of the housing 31. Also, the recess portions 312 are disposed side by side in the axial direction of the housing 31. The projection portion 311 is provided so as to form the side walls of adjacent recess portions 312. The recess portions 312 are filled with the mold resin portion 4. Thus, in addition to the mold resin portion 4 in the recess portions 312 functioning as an anchor, compared to a case in which the projection portion 311 has a uniform height and the recess portions 312 are not provided, the contact area between the housing 31 and the mold resin portion 4 is increased. Accordingly, by the recess portions 312 being provided, the adhesion between the housing 31 and the mold resin portion 4 can be improved.

In the present example, two recess portions 312 are provided. Of the plurality of recess portions 312, the recess portions 312 located on the closed end surface side of the housing 31 is formed by a cutout connected to the closed end surface. The closed end surface side of the housing 31 is the right side in FIG. 7. Of the plurality of recess portions 312, the recess portions 312 located on the opening side of the housing 31 is formed by a groove with a side wall on either side. The opening side of the housing 31 is the left side in FIG. 7.

The depth of the recess portions 312 in the present example is the same as the maximum height of the projection portion 311. By the projection portion 311 being formed by the recess portions 312 in this manner, compared to a case in which no recess portions 312 are provided, the projection amount of the projection portion 311 from the outer surface of the housing 31 can be reduced. Because the projection amount of the projection portion 311 from the outer surface of the housing 31 is small, the thickness of the mold resin portion 4 from the outer surface of the housing 31 can be decreased, making decreasing the size easy.

Three or more recess portions 312 may be provided. In this case, two projection portions 311 are provided side by side in the axial direction of the housing 31. Only one recess portion 312 may be provided. In this case, one of the side walls of the projection portion 311 is formed by the side wall of the recess portion 312 and the other side wall is formed by the closed end surface of the housing 31. There may be no recess portions 312 provided. In this case, the projection portion 311 projects from the outer surface of the housing 31.

Test Examples

Figure 8:
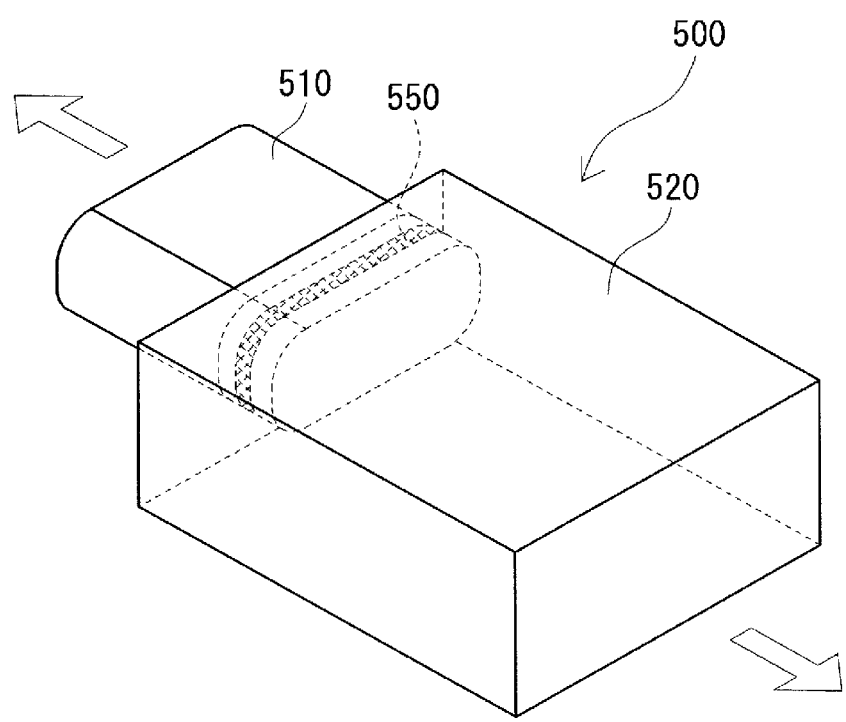
FIG. 8 is a perspective view illustrating a test piece used in a shear tensile test for evaluating adhesive performance.

A connector apparatus provided with a welded portion was manufactured, and the adhesive performance between the housing and the mold resin portion of the connector was examined. The adhesive performance was evaluated using a test piece 500 illustrated in FIG. 8. The test piece 500 is a member simulating the join section between the housing and the mold resin portion of the connector.

Test Piece

Sample No. 1-1

An absorbing member 510 simulating the section of the housing that is joined to the mold resin portion was prepared. The absorbing member 510 is made of PBT resin with a transmittance of 1%. The absorbing member 510 has a column-like shape shaped like a stadium with a circumferential length of 50 mm.

A transmitting member 520 was injection molded covering a portion of the prepared absorbing member 510. The transmitting member 520 is made of a thermoplastic polyester resin with a transmittance of 40%. VYLOSHOT (registered trademark) available from TOYOBO CO., LTD. was used as the thermoplastic polyester resin. The transmitting member 520 was formed covering the absorbing member 510 in an area of 5 mm from a first end surface side in the axial direction of the absorbing member 510. The transmitting member 520 is a quadrangular prism. The length of the region where the absorbing member 510 and the transmitting member 520 overlap was 50 mm. The length of the overlapping region is the length in the circumferential direction of the absorbing member 510. The circumferential length of the transmitting member 520 was 76 mm.

In the region where the absorbing member 510 and the transmitting member 520 overlap, the entire periphery of the absorbing member 510 was irradiated all at once through the transmitting member 520, with the transmitting member 520 pressed against the absorbing member 510. In the all at once laser irradiation, the pressing apparatus 400 illustrated in FIG. 6 was used. The pressing load was 2 kgf. The laser source was a fiber laser. Each spot diameter of the laser was 2.0 mm. The wavelength of the laser was 940 nm. As a result, a welded portion 550 was formed around the entire periphery of the absorbing member 510.

Sample No. 1-2

With the sample no. 1-2, the transmitting member 520 was formed covering the absorbing member 510 in an area of 3 mm from a first end surface side in the axial direction of the absorbing member 510. Also, with the sample no. 1-2, the laser irradiation method was changed from that used for the sample no. 1-1. With the sample no. 1-2, in the region where the absorbing member 510 and the transmitting member 520 overlap, the entire periphery of the absorbing member 510 was scanned and irradiated through the transmitting member 520. A laser scan of one revolution was performed on the absorbing member 510 and the transmitting member 520. In other words, the scan start position of the laser is essentially the same as the scan end position. The scan speed of the laser was 50 mm/min. In the scanning irradiation, the spot diameter of the laser was 1.5 mm Other conditions are as with the sample no. 1-1. As a result, a welded portion 550 was formed around the entire periphery of the absorbing member 510.

Measuring Variation in Width of Welded Portion

Using the obtained test piece 500 of each sample, the width of the welded portion 550 along the circumferential direction of the absorbing member 510 was measured by separating the absorbing member 510 and the transmitting member 520 and exposing the welded portion 550. Here, the absorbing member 510 and the transmitting member 520 were separated by using pliers to separate the transmitting member 520 from the absorbing member 510. Also, the ratio of the difference between the maximum width and the minimum width to the maximum width of the welded portion 550 in the circumferential direction of the absorbing member 510 was obtained. The ratio is referred to as the width ratio. The results are listed in Table 1.

Also, seven measurement points were provided along the circumferential direction of the absorbing member 510 and the average width of the welded portion 550 using these seven measurement points was obtained. With the sample no. 1-2, the laser scan start position was set as measurement point 1, the laser scan end position was set as measurement point 7, and points evenly spaced between measurement points 1 and 7 were set as measurement points 2 to 6. With the sample no. 1-2, the scan start position of the laser is essentially the same as the scan end position. However, with the sample no. 1-2, at the same position, a step is produced at the welded portion 550. The width at measurement point 1 and the width at measurement point 7 can be measured from the step of the welded portion 550. With the sample no. 1-1, measurement points are set at positions as with the sample no. 1-2. With the sample no. 1-1 also, the width at measurement point 1 and the width at measurement point 7 can be measured from the step of the welded portion 550. Also, the ratio of the maximum width to the average width and the ratio of the minimum width to the average width are obtained. The ratio of the maximum width to the average width is referred to as the maximum width ratio. The ratio of the minimum width to the average width is referred to as the minimum width ratio. The results of the width of the welded portion 550 at each measurement point, the maximum width ratio, and the minimum width ratio are listed in Table 1.

Adhesive Performance Evaluation

A shear tensile test was used to evaluate the obtained test pieces 500 of each sample on adhesive performance. The shear tensile testing instrument used was the Autograph AGS-X Series available from Shimadzu Corporation. In the shear tensile test, the absorbing member 510 and the transmitting member 520 were pulled in opposite direction in the length direction as illustrated by the white arrows in FIG. 8 and the maximum tensile stress when the absorbing member 510 and the transmitting member 520 separated was obtained. This measurement was performed five times for each sample. The average value of the maximum tensile stress is indicated in Table 1.

Also, the adhering surface of the absorbing member 510 and the transmitting member 520 was visually observed. It was found that for the welded portion 550 of all samples material failure occurred. Material failure means that failure occurred inside either the absorbing member 510 or the transmitting member 520 and the constituent material of one was adhered to the surface of the separated other.

TABLE 1

| | | Sample No. | |
|---|---|---|---|
| | | 1-1 | 1-2 |
| Laser irradiation | | All at once | Scanning |
| Width (mm) | Measurement point 1 | 2.965 | 0.880 |
| | Measurement point 2 | 2.924 | 1.079 |
| | Measurement point 3 | 3.011 | 1.211 |
| | Measurement point 4 | 3.035 | 1.473 |

TABLE 1-continued

| | Sample No. | |
|---|---|---|
| | 1-1 | 1-2 |
| Measurement point 5 | 3.063 | 1.680 |
| Measurement point 6 | 3.105 | 1.821 |
| Measurement point 7 | 3.091 | 2.044 |
| Width ratio (%) | 6 | 57 |
| Maximum width ratio (%) | 103 | 140 |
| Minimum width ratio (%) | 97 | 60 |
| Maximum tensile stress (MPa) | 4.60 | 1.70 |

As listed in Table 1, the sample no. 1-1 using all at once irradiation has a small width ratio of 10% or less. Also, the sample no. 1-1 using all at once irradiation has a small maximum width ratio of 110% or less and a large minimum width ratio of 90% or greater. In other words, in the sample no. 1-1 using all at once irradiation, the width of the welded portion is uniform along the circumferential direction of the absorbing member and there is little variation. Thus, the sample no. 1-1 using all at once irradiation is considered to have high adhesive strength between the absorbing member and the transmitting member and improved adhesion. The sample no. 1-2 using scanning irradiation has a very large width ratio of 57%. Also, the sample no. 1-2 using scanning irradiation has a large maximum width ratio of 140% and a small minimum width ratio of 60%. In other words, in the sample no. 1-2 using scanning irradiation, the width of the welded portion is non-uniform along the circumferential direction of the absorbing member and there is much variation. In the case of scanning irradiation, the heat from the laser is transferred in the scanning direction, with welding tending to occur as the scanning proceeds. Thus, with the sample no. 1-2, it is considered that the welded portion was formed with the width increasing as the scanning proceeded. In reality, with the sample no. 1-2, the width was the smallest at measurement point 1, which is the scan start position, gradually increased in width as the scanning proceeds, and was the largest at measurement point 7, which is the scan end position. In the sample no. 1-2 using scanning irradiation, the width of the welded portion is non-uniform along the circumferential direction of the absorbing member and there is much variation. Thus, it is considered that the adhesive strength between the absorbing member and the transmitting member is low and the adhesion is reduced.

All at once irradiation can be performed with a configuration in which the welded portion is simultaneously irradiated around the entire periphery of the absorbing member. Accordingly, compared to scanning irradiation, it can be considered able to make the laser irradiation apparatus simpler.

The present invention is not limited to these examples and is defined by the scope of the claims, and all modifications that are equivalent to or within the scope of the claims are included.

LIST OF REFERENCE NUMERALS

1 Connector apparatus
2 Circuit board
20 Conductor path
21 Conductive pattern
22 Solder
3 Connector
31 Housing
311 Projection portion
311s Distal end surface
312 Recess portion
32 Terminal
33 Attachment portion
34 Fixing member
4 Mold resin portion
40 Trace portion
5 Welded portion
100 Assembled article
200 Integrated article
400 Pressing apparatus
410 Metal portion
411 Optical fiber
420 Glass portion
500 Test piece
510 Absorbing member
520 Transmitting member
550 Welded portion

What is claimed is:

1. A connector apparatus comprising:
   a circuit board;
   a connector; and
   a mold resin portion, wherein
   the circuit board includes a conductor path,
   the connector includes
      a housing with a cylindrical shape and made of a resin; and
      a terminal projecting outward in an axial direction of the housing from inside the housing, the terminal being configured to connect to the conductor path,
   the mold resin portion collectively covers the circuit board, the terminal located outside the housing, and a portion of the housing,
   the housing and the mold resin portion include a welded portion formed by welding together constituent materials of the housing and the mold resin portion, and
   the welded portion is provided around an entire periphery of the housing and has a difference between a maximum width and a minimum width along a circumferential direction of the housing of 30% or less of the maximum width.

2. The connector apparatus according to claim 1, further comprising:
   four or more measurement points along the circumferential direction of the housing, wherein
   a ratio of the maximum width to an average width of the welded portion from the four or more measurement points is 130% or less, and
   a ratio of the minimum width to the average width is 70% or greater.

3. The connector apparatus according to claim 1, wherein
   the housing includes a projection portion provided around an entire periphery, and
   the welded portion is provided on the projection portion.

4. The connector apparatus according to claim 1, wherein
   a transmittance of the mold resin portion is 40% or greater,
   a transmittance of the mold resin portion is a ratio (b1/a1) between an amount of light a1 and an amount of light b1×100,
   the amount of light a1 is an amount of light of a laser with a wavelength of 940 nm, and
   the amount of light b1 is an amount of light of the laser passing through a test piece of constituent material of the mold resin portion with a thickness of 2 mm.

5. The connector apparatus according to claim 1, wherein a transmittance of the housing is 10% or less,
- a transmittance of the housing is a ratio (b2/a2) between an amount of light a2 and an amount of light b2×100,
- the amount of light a2 is an amount of light of a laser with a wavelength of 940 nm, and
- the amount of light b2 is an amount of light of the laser passing through a test piece of constituent material of the housing with a thickness of 2 mm.

6. The connector apparatus according to claim 1, wherein the mold resin portion contains polyamide resin or polyester.

7. The connector apparatus according to claim 1, wherein the housing contains polyester.

8. The connector apparatus according to claim 1, wherein the mold resin portion and the housing both contain polyester.

9. The connector apparatus according to claim 1, wherein the mold resin portion includes a surface that comes into contact with atmosphere.

10. The connector apparatus according to claim 1, wherein the mold resin portion is an injection molded body.

11. The connector apparatus according to claim 1, wherein the circuit board and the connector form a control unit.

12. A method of manufacturing a connector apparatus comprising:
- preparing an assembled article including a circuit board and a connector;
- forming an integrated article by covering a portion of the assembled article with a mold resin portion; and
- irradiating the integrated article with a laser, wherein
- the circuit board includes a conductor path,
- the connector includes
  - a housing with a cylindrical shape and made of a resin, and
  - a terminal projecting outward in an axial direction of the housing from inside the housing, the terminal being configured to connect to the conductor path,
- in the forming the integrated article, the circuit board, the terminal located outside the housing, and a portion of the housing are collectively covered by the mold resin portion, and
- in the irradiating with the laser, an entire periphery of the housing is irradiated with a laser all at once through the mold resin portion, and constituent materials of the housing and the mold resin portion are welded together.

13. The method of manufacturing a connector apparatus according to claim 12, wherein
- the irradiating with the laser is performed with the mold resin portion pressed against the housing side.

* * * * *